No. 812,399. PATENTED FEB. 13, 1906.
J. F. BOTTOMLEY, R. S. HUTTON & A. PAGET.
MANUFACTURE OF SILICA GLASS.
APPLICATION FILED MAR. 21, 1905.
3 SHEETS—SHEET 2.
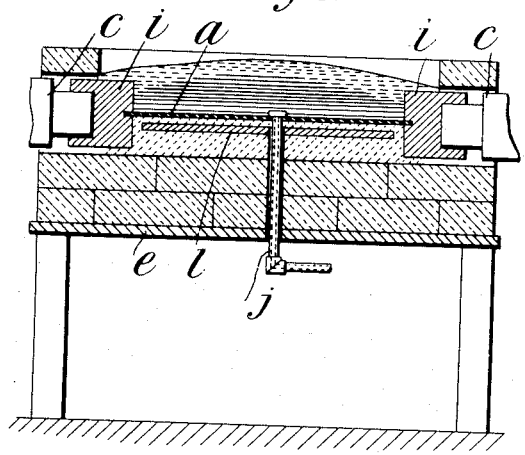
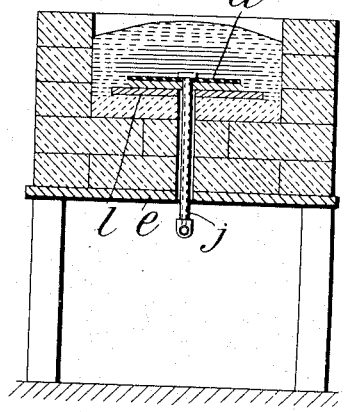
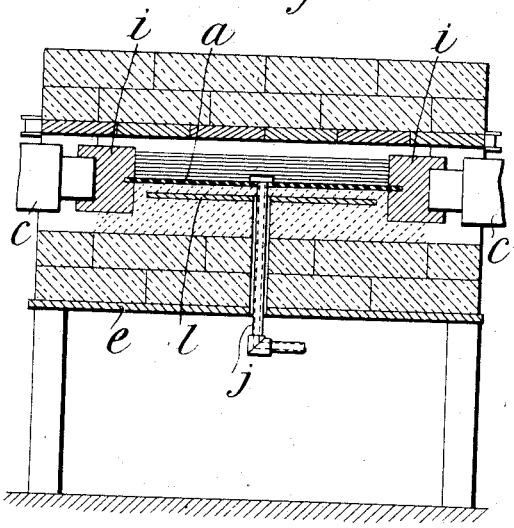
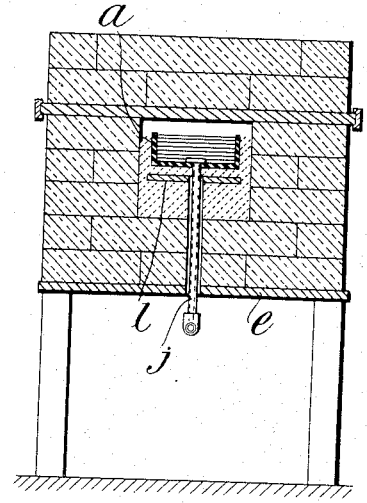

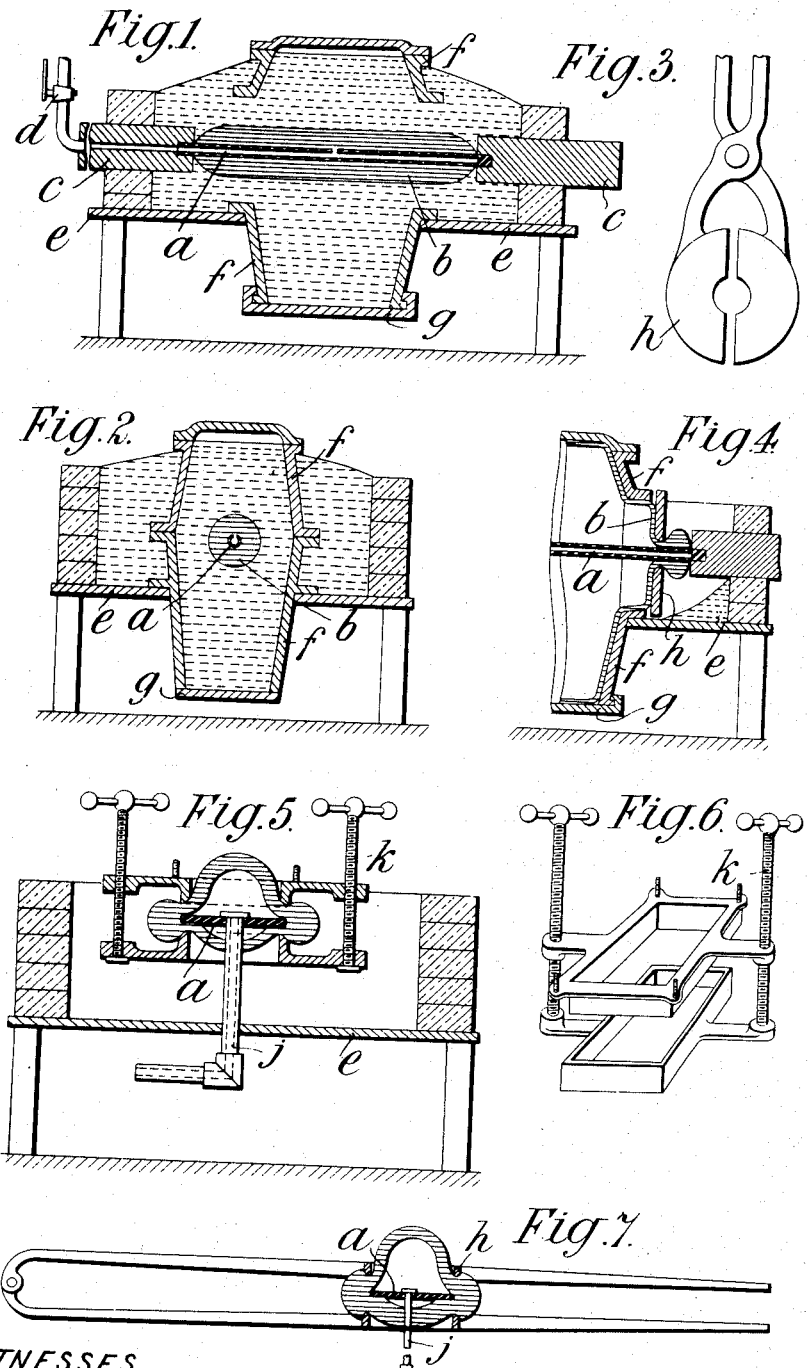

No. 812,399. PATENTED FEB. 13, 1906.
J. F. BOTTOMLEY, R. S. HUTTON & A. PAGET.
MANUFACTURE OF SILICA GLASS.
APPLICATION FILED MAR. 21, 1905.

WITNESSES.
INVENTORS.

UNITED STATES PATENT OFFICE.

JAMES FRANCIS BOTTOMLEY, OF WALLSEND, ROBERT SALMON HUTTON, OF MANCHESTER, AND ARTHUR PAGET, OF NORTH CRAY, ENGLAND.

MANUFACTURE OF SILICA GLASS.

REISSUED

No. 812,399.     Specification of Letters Patent.     Patented Feb. 13, 1906.

Application filed March 21, 1905. Serial No. 251,321.

*To all whom it may concern:*

Be it known that we, JAMES FRANCIS BOTTOMLEY, a resident of Wallsend-on-Tyne, in the county of Northumberland, ROBERT SALMON HUTTON, a resident of Manchester, in the county of Lancaster, and ARTHUR PAGET, a resident of North Cray, in the county of Kent, England, subjects of His Majesty the King of Great Britain, have invented a certain new and useful Improvement in the Manufacture of Silica Glass, of which the following is a specification.

This invention relates to improvements in the manufacture of silica glass from quartz or practically pure glass-makers' sand, by which is meant a silica glass the fusing-point of which is above the temperature obtainable in gas or fuel furnaces as used in glass manufacture.

We have observed that the conditions of working are limited by the fact that by heating quartz or glass-makers' sand unmixed with other substances it is only possible to get it into a plastic state and that further heating produces volatilization before a really fluid condition is obtained. In order, therefore, to produce articles of any desired shape, we heat a mass of quartz, sand, or other suitable form of silica by conduction and (or) radiation from material—for example, carbon or graphite—shaped so as to give the desired heating area and brought to the required temperature by the passage of an electric current, and we provide a means whereby when the mass has reached a plastic condition it may be directly shaped or molded *in situ* into the desired form.

The methods of heating by conduction include passage of an electric current through a core formed of a rod or tube embedded in a granulated or pulverized mass of the material to be fused, or through a plate either embedded in or supporting the material to be fused, or through the wall or walls of the receptacle containing the material.

The methods of heating by radiation include the passage of an electric current through a core formed of a plate or number of plates so situated as to be out of contact with the material to be heated and forming, in effect, a cover for the furnace.

The methods of working the plastic material may include molding by pressure of a die or mold into the mass contained in a corresponding receptacle, or by pressing between corresponding molds, or by blowing the material upward or downward freely or into molds. For example, a tubular and perforated heating-core fixed between two carbon terminals or electrodes may be embedded in a mass of sand or other form of silica, one or both of the electrodes being cored out so as to form a passage, whereby air or other gas under pressure may be introduced at will. Sufficient currrent is passed through the core to raise it to the requisite temperature and is maintained until a sufficient quantity of the material immediately surrounding the heated zone is brought into a plastic state. In this condition the fused material forms a gas-tight joint round the ends of the core. By introducing into and through the core at the required moment a supply of gas under pressure and by regulating the same by means of a gas-tap or other device attached to the gas-passage the plastic mass may be freely expanded or caused to assume any desired shape by blowing into an external mold, the external unagglomerated material being removed where necessary to allow of greater freedom of expansion.

In order to give security against blowing out at the joints between the resistance material and the plastic silica, means may be provided for mechanically compressing or cooling or compressing and cooling suitable portions of the plastic mass before subjecting it to gaseous pressure.

It will be evident that for the passage of gas it is unnecessary to make use of the actual heating material or electrodes themselves but that an independent tube can be inserted for this purpose at any convenient spot.

Instead of using a rod or tube a flat plate or rod or tube flattened at the center and heated by the passage of an electric current may be utilized for obtaining a more extended surface of the plastic mass.

It will be sufficient in many cases to use one side only of the heated resistance, a highly-refractory material, such as magnesia or alumina, being placed on the other side.

Where a more extended heating-surface is required, a number of plates may be employed, which may be connected electrically in series or in parallel, as desired.

On account of the impossibility of obtaining quartz in a sufficiently fluid condition the methods used in the molding and shaping of glass on a large scale cannot be directly applied. By the use of our invention, however, and by obtaining the plastic material in the desired form and position it is possible to adopt a suitable modification of the processes used in the molding of glass—namely, by fusing and molding *in situ*. For instance, the plate of resistance material may be provided with a perforation or number of perforations serving as a passage or passages for gas. By the passage of an electric current the silica in contact with the plate having been made plastic the metal or other mold or molds is or are pressed down over the plastic mass. The pressure of gas through the gas-passage is then regulated in such a manner that the plastic mass is driven into the mold, thus causing it to take the desired shape, the mold being provided with an air-outlet at some suitable position.

The material produced by the methods described is for the most part glazed on the inner surface only, while the outer is covered with a thin layer of agglomerated sand. The production of a material glazed on both sides may be brought about by limiting the amount of material within the heated zone, so that the whole is rendered plastic. For example, the heat from a resistance-core may be made to radiate onto a mass of silica in an inclosed chamber till the whole is made plastic, care being taken to render the heat losses through external radiation small. Suitable gas-passages are provided whereby the plastic material may be blown *in situ*, either freely or into superimposed molds, suitable arrangements being made for removing the resistance-core from above the fused mass, or vice versa.

In the alternative the silica may be inclosed in a crucible or other suitable receptacle which may, if desired, form one part of a mold and which may be heated by the passage of the electric current through the walls of the same, or through a suitable resistance material surrounding it, or through both, the plastic material being shaped either by blowing from the receptacle into an exterior mold or by pressure of a mandrel or the like into the plastic mass.

It will be evident that in fusing silica by the heat generated by the passage of the electric current through a resistance for the purposes of this invention other materials than carbon of sufficiently high melting or volatilizing point and not liable to react with silica within the range of temperature of plastic silica might be used as the heating media.

In order to obtain a proper distribution of the mass prior to blowing, the natural flow of such mass when in a viscous state may be utilized. For example, in heating a rod or the like surrounded by sand the fused mass will gradually flow so as to be thickest at the center of the under side of the rod.

Provision may be made for allowing the mass during the blowing to expand upward or downward at will or for rotating it so as to bring the thickened portion to the top.

In the case of the shaping of a plastic mass surrounded by unfused sand by blowing it into an external mold the mold may be perforated, so as to allow of the escape of the sand as the plastic mass expands during blowing, an external mold being used where necessary to close the perforations until the escape of the sand is desired or a single large opening may be substituted for the perforations closed as before by a cover of any desired form.

Referring now to the drawings, Figures 1 and 2 are longitudinal and transverse sections, respectively, of a furnace exemplifying a method of heating by conduction through a tubular core. Fig. 3 shows a pair of tongs suitable for mechanically pressing the fused mass in order to secure the joint between the core and the plastic material. Fig. 4 is a detail of Fig. 1 after blowing. Fig. 5 is a transverse section showing heating by conduction through a plate embedded in sand, with an independent tube for introducing gas under pressure into the interior of the fused mass and with a mechanical device for pressing the edges to secure a joint, the material being shown in the act of expansion under pressure. Fig. 6 is a perspective view of the clamping device. Fig. 7 is an alternative clamping device to that shown in Figs. 5 and 6. Figs. 8 and 9 are longitudinal and transverse sections, respectively, of the furnace, showing a method of heating by a resistanc-plate supporting the material to be fused. Figs. 10 and 11 are longitudinal and transverse sections, respectively, of a furnace, showing a method of heating the material in a receptacle through the walls of which the heating-current passes, the material to be fused being limited, so that it is fused throughout. Figs. 12 and 13 are longitudinal and transverse sections, respectively, of a furnace, showing a method of heating by radiation from a resistance-plate heated by the passage of a current with means for separating the source of heat and the portion of the furnace containing the fused material. Figs. 14, 15, and 16 are perspective views of a shaped receptacle, die, and molded product, respectively. Fig. 17 shows the same furnace as Figs. 12 and 13, with an alternative method of molding by gas-pressure introduced from below.

In Figs. 1 and 2 the tubular core $a$ consists of a cored-out rod of graphite or agglomerated carbon having one or more peripheral perforations, which may be lightly plugged to prevent choking, through which air introduced into the core may pass into the center of the fused mass $b$. The tubular core is fixed between terminals or electrodes $c$ of graphite or carbon, one of which is cored for a gas-passage and is connected, by means of a gas-tap $d$, with a source of compressed air or other gas.

The method of leading the current to the terminals is not shown, but can be done in any convenient way.

$e$ is an iron plate, to which the molds $f$ can be fixed, and serves as the bed of the furnace. Loose brickwork may be built up all round to retain the material to be fused.

In order to remove the sand prior to blowing, the lower mold is fitted with a sliding door $g$, through which the sand contained within the molds may flow out, the door being closed after the escape of the sand.

The upper mold may conveniently be provided with a removable cover, as shown, to facilitate filling in sand prior to fusion.

Fig. 3 shows a form of tongs $h$ for pressing the fused mass at each end, so as to secure a gas-tight joint.

Fig. 4 is a detailed view of Fig. 1, showing the tongs in position and the fused mass blown out, so as to fill the mold.

Figure 12:
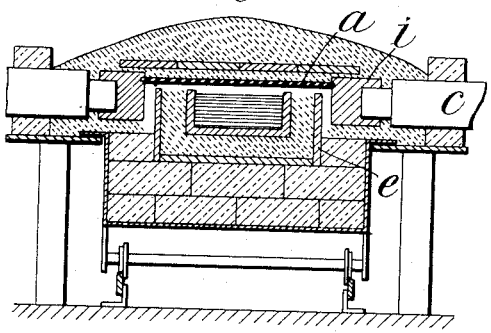

The following is an example of a method of operation: Using a graphite core twenty inches long and one and three-eighths inches external diameter with walls three-sixteenths of an inch thick embedded in glass-makers' sand, a current at about twelve hundred amperes at about seventeen volts is passed through the core for one hour. The fusion being then effected the clamps are closed round the ends, so as to secure the joints. The unfused sand in the furnace is removed through the sliding door $g$ and compressed air gradually admitted, so as to force the plastic material into the molds $f$, which may be made of any material capable of standing the temperature of the exterior of the fused mass. The blown-out product is then removed and finished as desired.

In the drawings the molds are shown as fixed in place prior to fusion being effected; but it will be evident that they could be put in position immediately prior to blowing, in which case the edges of the molds may be brought close to the fused mass without fear of overheating.

In carrying out the experiments of heating by conduction it is important to obtain suitable materials for the heating-core, as want of homogeneity in the core might result in considerable reaction taking place between the carbon and the silica with the formation of carborundum and evolution of carbonic oxid owing to local overheating. With a sufficiently homogeneous material for the core it is possible by the proper regulation of the temperature and length of heating to reduce the formation of gas due to local action to a negligible amount.

In Fig. 5 the heating-core consists of a carbon or graphite plate $a$, which is embedded in the material to be fused. It is fixed between terminal blocks $i$, as shown in Fig. 8, into which the electrodes $c$ pass. The plate is perforated about its center to admit an independent tube $j$, formed of some suitable material, such as carbon or graphite, and preferably flanged at the head, so as to prevent leakage during blowing. On completion of the fusion the clamp $k$ (shown in perspective in Fig. 6) is tightened, so as to compress the edges of the fused material onto the plate to prevent leakage during blowing. Compressed air is then admitted, so as to expand the fused mass freely, as shown, or into an inverted mold, which may be secured by lugs to the clamp $k$.

In Fig. 7 the clamping device consists of corresponding rings of the required shape fixed on the jointed arms. For example, using an agglomerated carbon plate eighteen by six inches by five-sixteenths of an inch, a current of about one thousand amperes at about twenty-two volts is passed through the plate until sufficient material has been fused. The figures, however, can only be taken as indicating average values and will be different for different kinds of carbon. It is of importance that the heating should not be done too rapidly, as reaction between the carbon or graphite and the silica is liable to take place. If the heating is prolonged, this may also be the case, and it may be advantageous gradually to decrease the amount of current when prolonged heating is required. When the fusion is complete, the clamps are tightened round the edges of the fused mass and compressed air introduced, as before described.

In Figs. 8 and 9 the carbon plate $a$ is fixed between terminal blocks $i$, into which the electrodes $c$ pass, the plate being supported by a thick plate of refractory material $l$, which, if an electrical conductor, is separated from the heated plate by an interposed layer of some refractory non-conducting material, such as magnesia. The material to be fused is placed on the heating-plate, which is perforated to admit an independent gas-tube $j$ of carbon or the like. When the fusion is complete, the shaping of the material is brought about by pressing a mold onto the fused mass and forcing the latter into it with compressed air or gas, leakage being prevented by the pressure of the mold on the fused material. The current requirements are of the same order as described with reference to Fig. 5.

In Figs. 10 and 11 the quantity of material to be fused is limited by inclosing it in a receptacle composed of plates $a$ and terminals $i$, through one or more of which the current passes, heat losses at the surface being prevented by a suitable cover of plates, preferably of carbon or graphite, supporting a mass of some heat-insulating material. When the inclosed material is fused throughout, the cover is removed and the material shaped by blowing into molds, as described with reference to Figs. 8 and 9, the product produced by this method being glazed on both sides.

Figure 13:
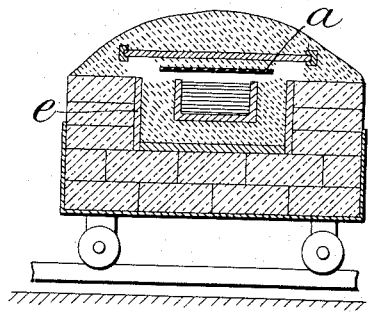
Figure 14:
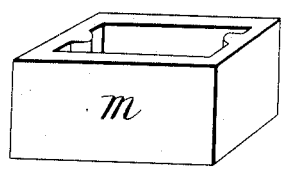
Figure 15:
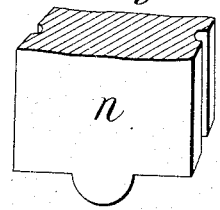
Figure 16:
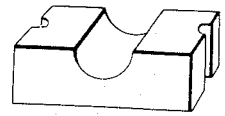

In Figs. 12 and 13 the plate $a$ is fixed between graphite terminal blocks $i$, into which the electrodes $c$ pass, and forms, in effect, a cover over the material to be fused, which is placed immediately below it in a shaped receptacle—such, for example, as $m$, (shown in Fig. 14,)—so as to be heated by raidation from it. As in the case of heating by conduction, as described with reference to Figs. 8 and 9, one side only of the plate is used, a refractory material, such as magnesia, being placed on the other. The shaped receptacle $m$ is surrounded by some heat-insulating material contained in an outside vessel $e$, the whole being mounted on a bogie and forming the lower half of the furnace. When the fusion is completed, the bogie is withdrawn, so as to separate the heating-plates from the lower portion of the furnace, and the plastic material brought into a position where it may be shaped by the pressure of a die, such as $n$. (Shown in Fig. 15.) Heat losses are prevented by a cover of carbon or graphite supporting a thick layer of heat-insulating material. For example, using an agglomerated carbon plate eighteen by six inches by five-sixteenths of an inch, a current of about fifteen hundred amperes at twenty-two volts is passed until the whole of the material is brought to a plastic condition. The molding is then carried out as above described.

Figure 17:
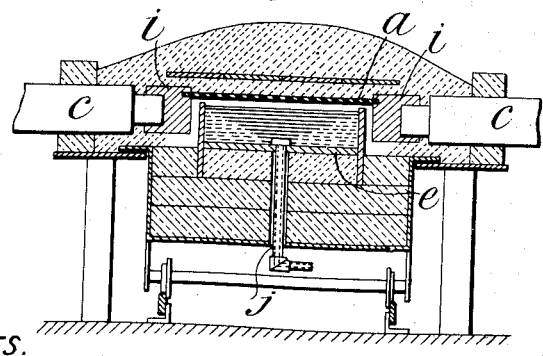

In Fig. 17 a similar method of heating is shown to that described with reference to Figs. 12 and 13. In this case the shaping of the material is brought about by introducing below the fused material an independent gas-tube $j$, connected to a supply of air or gas, as before described. When the fusion is completed, the lower portion of the furnace is separated from the heating-plate and shaping brought about by blowing the plastic material into molds pressed into the mass. In the case of fusing by radiation it is obvious that as the material is not in contact with the heating-surface there is no risk of chemical reaction taking place between this surface and the surface of the plastic mass, and, further, that where the plastic mass is contained in a carbon receptacle the temperature of the receptacle will not be above that of the molten silica, and consequently the reaction is reduced to a minimum.

It follows that it is possible by the use of this method to continue the heating for a longer period than would otherwise be feasible and that larger masses may be dealt with.

It will be evident that the methods above described for the treatment of pure silica may also be applied to silica glasses containing so high a percentage of silica as to be infusible in gas or fuel furnaces as used in glass manufacture without departing from the scope of this invention.

What is claimed is—

1. The improved process of manufacturing articles of silica glass which consists in heating the crude material by means of the heat generated by a resistance such as carbon placed in an electric circuit until the requisite mass is in a plastic condition, then while still plastic shaping the mass by internal blowing.

2. The improved process of manufacturing articles of silica glass which consists in heating the crude material by means of the heat generated by a resistance such as carbon placed in an electric circuit and out of contact with the material to be fused until the requisite mass is in a plastic condition, then while still plastic shaping the mass by internal blowing.

3. The improved process of manufacturing articles of silica glass which consists in fusing the crude material by means of the heat generated by a hollow perforated resistance-core placed in an electric circuit, then securing the fused mass to the extremities of the core and then passing compressed air or gas through said core so as to effect the shaping of the fused mass *in situ*.

4. The improved process of manufacturing articles of silica glass which consists in fusing the crude material by means of the heat generated by a resistance placed in an electric circuit, then securing the extremities of the fused mass, then blowing the fused mass and effecting the shaping *in situ*.

In testimony whereof we have hereunto set our hands in the presence of the subscribing witnesses.

JAMES FRANCIS BOTTOMLEY.
ROBERT SALMON HUTTON.
ARTHUR PAGET.

Witnesses to the signature of James Francis Bottomley:
H. W. J. VERTIGAN,
JOHN T. GRUNDY.

Witnesses to the signature of Robert Salmon Hutton:
H. E. WOOD,
JAMES GRIFFITHS.

Witnesses to the signature of Arthur Paget:
H. D. JAMESON,
F. L. RAND.